(12) United States Patent
Noguchi et al.

(10) Patent No.: US 11,683,364 B2
(45) Date of Patent: Jun. 20, 2023

(54) DISTRIBUTED DEVICE MANAGEMENT SYSTEM AND DISTRIBUTED DEVICE MANAGEMENT METHOD

(71) Applicant: Nippon Telegraph and Telephone Corporation, Tokyo (JP)

(72) Inventors: Hirofumi Noguchi, Musashino (JP); Yoji Yamato, Musashino (JP); Tatsuya Demizu, Musashino (JP); Misao Kataoka, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 184 days.

(21) Appl. No.: 16/967,921

(22) PCT Filed: Feb. 13, 2019

(86) PCT No.: PCT/JP2019/005094
§ 371 (c)(1),
(2) Date: Aug. 6, 2020

(87) PCT Pub. No.: WO2019/159964
PCT Pub. Date: Aug. 22, 2019

(65) Prior Publication Data
US 2021/0037085 A1 Feb. 4, 2021

(30) Foreign Application Priority Data
Feb. 14, 2018 (JP) .............................. JP2018-023748

(51) Int. Cl.
*H04L 67/10* (2022.01)
*G16Y 30/00* (2020.01)
(Continued)

(52) U.S. Cl.
CPC .............. *H04L 67/10* (2013.01); *G16Y 20/00* (2020.01); *G16Y 30/00* (2020.01); *G16Y 40/00* (2020.01);
(Continued)

(58) Field of Classification Search
CPC ........ G16Y 20/00; G16Y 30/00; G16Y 40/00; G16Y 40/10; G16Y 40/20; G16Y 40/30;
(Continued)

(56) References Cited

U.S. PATENT DOCUMENTS 6,463,454 B1 * 10/2002 Lumelsky ............... H04L 67/06
718/105
8,751,613 B1 * 6/2014 Medved .................. H04L 47/10
370/229
(Continued)

OTHER PUBLICATIONS

Ikebe et al., "Distributed Live Data Search Architecture for Resource Discovery on Internet of Things," IEEE World Forum on Internet of Things, Dec. 12, 2016, pp. 591-596.

*Primary Examiner* — James N Fiorillo
(74) *Attorney, Agent, or Firm* — Fish & Richardson P.C.

(57) ABSTRACT

A distributed device management system specifies a device capable of supplying request data used for providing a service, from among a plurality of devices connected to a network. Device management function units are disposed so as to be geographically distributed and manage the states of the devices located in deployed areas. A device specifying function unit has a device inquiry cache in which a response log including the type of data which was previously required for the service and an identifier of the device management function unit that manages the device which was capable of supplying the data is recorded. In a case where this request data coincides with the type of data included in the response log, an inquiry is transmitted to the device management
(Continued)

function unit associated with the request data in the response log.

6 Claims, 5 Drawing Sheets

(51) Int. Cl.
  *G16Y 20/00* (2020.01)
  *G16Y 40/00* (2020.01)
  *H04L 67/51* (2022.01)
  *H04L 67/52* (2022.01)
  *H04L 67/60* (2022.01)
  *H04L 67/568* (2022.01)
(52) U.S. Cl.
  CPC .............. *H04L 67/51* (2022.05); *H04L 67/52* (2022.05); *H04L 67/568* (2022.05); *H04L 67/60* (2022.05)
(58) Field of Classification Search
  CPC ........ G16Y 40/35; G16Y 40/40; H04L 67/10; H04L 67/51; H04L 67/52; H04L 67/60; H04L 67/568; H04L 47/70; G06F 8/60; G06F 9/46; G06F 13/00; G06F 3/00; G06F 15/16
  USPC ......................................................... 709/201
  See application file for complete search history.

(56) References Cited

U.S. PATENT DOCUMENTS

| | | | |
|---|---|---|---|
| 11,113,333 B2* | 9/2021 | Maharajh | H04L 65/752 |
| 11,599,811 B1* | 3/2023 | Savastinuk | G06N 20/00 |
| 2005/0265066 A1* | 12/2005 | Machiyama | H04N 1/00278 |
| | | | 365/145 |
| 2007/0027974 A1* | 2/2007 | Lee | H04L 43/16 |
| | | | 709/223 |
| 2008/0008179 A1* | 1/2008 | Chen | H04L 61/5007 |
| | | | 370/392 |
| 2008/0222223 A1* | 9/2008 | Srinivasan | H04L 67/1097 |
| 2012/0197852 A1* | 8/2012 | Dutta | H04L 67/565 |
| | | | 707/E17.005 |
| 2015/0074596 A1* | 3/2015 | Djabarov | G06F 16/9537 |
| | | | 715/800 |
| 2016/0255139 A1* | 9/2016 | Rathod | H04N 1/32101 |
| | | | 709/203 |
| 2017/0280279 A1* | 9/2017 | Ghosh | H04L 67/54 |
| 2018/0091311 A1* | 3/2018 | Kisley | H04L 9/0897 |
| 2019/0253863 A1* | 8/2019 | Kodaypak | H04W 4/025 |
| 2020/0242649 A1* | 7/2020 | Faith | G06Q 30/0269 |
| 2020/0260214 A1* | 8/2020 | Wu | H04W 4/40 |
| 2020/0267563 A1* | 8/2020 | Sevindik | H04W 16/14 |
| 2021/0377210 A1* | 12/2021 | Singh | G06F 21/73 |
| 2022/0014512 A1* | 1/2022 | Raleigh | H04L 63/20 |

* cited by examiner

| ADJACENT DEVICE MANAGEMENT FUNCTION UNIT NAME | IP ADDRESS |
|---|---|
| DEVICE MANAGEMENT FUNCTION UNIT B | yyy.yyy.yyy.yyy |
| DEVICE MANAGEMENT FUNCTION UNIT C | zzz.zzz.zzz.zzz |
| ⋮ | ⋮ |

200 — ADJACENT DEVICE MANAGEMENT FUNCTION UNIT NAME
202 — IP ADDRESS

Fig. 2

| DEVICE INQUIRY | INQUIRY RESULT | | |
|---|---|---|---|
| REQUEST DATA TYPE | RESPONDING DEVICE-MANAGEMENT-FUNCTION-UNIT NAME | IP ADDRESS | REGISTRATION TIME |
| REAL-TIME VIDEO OF MR/MISS/MRS. N | DEVICE MANAGEMENT FUNCTION UNIT A | xxx.xxx.xxx.xxx | 2017 1201 11:00:00:00:01 |
| REAL-TIME VIDEO OF AUTOMOBILE HAVING NUMBER XXXX | DEVICE MANAGEMENT FUNCTION UNIT B | yyy.yyy.yyy.yyy | 2017 1201 11:00:00:00:05 |
| ⋮ | ⋮ | ⋮ | ⋮ |

DISTRIBUTED DEVICE MANAGEMENT SYSTEM AND DISTRIBUTED DEVICE MANAGEMENT METHOD

CROSS-REFERENCE TO RELATED APPLICATIONS

This application is a National Stage application under 35 U.S.C. § 371 of International Application No. PCT/JP2019/005094, having an International Filing Date of Feb. 13, 2019, which claims priority to Japanese Application Serial No. 2018-023748, filed on Feb. 14, 2018. The disclosure of the prior application is considered part of the disclosure of this application, and is incorporated in its entirety into this application.

TECHNICAL FIELD

The present disclosure relates to a distributed device management system and a distributed device management method for utilizing devices distributed in a network.

BACKGROUND ART

In recent years, the spread of IoT (Internet of Things) has been significantly expanded, and thus it is predicted that 50 billion devices will be connected to the Internet by 2030. If devices connected to the Internet, of which the number is expected to increase in the future, can be shared for various purposes, it is possible to implement services covering a wide range at low cost.

Examples of the service using shared devices include a watching service of an elderly person or a child. If a surveillance camera installed at a store or a street is provisionally used in the watching service instead of providing a camera dedicated for the watching service, it is possible to know the situation of a specific person at low cost.

It is necessary to specify devices capable of fulfilling each service, from among a large number of candidate devices connected to the Internet, in order to implement such a service using the shared device. For example, in a watching service, it is necessary to specify a camera that captures an image of a watching target.

However, because the device capable of serving a desired purpose changes at any time, it is not possible to simply specify the device.

For example, if a service subject (for example, a watching target) moves, a device (such as a fixed installed surveillance camera) that captures an image of the person changes.

In addition, in a case where a device such as a smart phone or a wearable device moves with a person who holds the device, the location of the device changes, and thus the device may move to a position at which an image of the target is not captured even though the service subject does not move. On the contrary, a new mobile device may come to a position at which an image of the service subject is captured.

As described above, in order to implement the service using the shared device, it is required to specify a device that can occasionally fulfill the service when the device that can serve the desired purpose can change at any time.

For example, Non Patent Literature 1 discloses a model for analyzing output information in the vicinity of a network topology for a device connected to a network to manage a state and a property of a device.

By using the model described in Non Patent Literature 1, a camera video including, for example, a specific person can be discovered. In addition, the model described in Non Patent Literature 1 has scale performance that treats a large amount of devices present in the Internet in order to understand and manage devices by being distributed by a computer in the vicinity of a device.

CITATION LIST

Non Patent Literature

Non Patent Literature 1: T. Ikebe, H. Noguchi, N. Hoshikawa, "Distributed Live Data Search Architecture for Resource Discovery on Internet of Things", IEEE World Forum on Internet of Things, pp. 591-596, December 2016

SUMMARY OF THE INVENTION

Technical Problem

FIG. 6 is a block diagram illustrating an outline of a device management model disclosed in the related art.

A model 60 is configured to include a device specifying function unit 62, a plurality of device management function units 64, and a plurality of devices 66.

The device management function units 64 are provided to be geographically distributed and manages the device 66 located in the vicinity of the own device management function unit.

In the model 60, the device 66 required for a service is specified in a procedure as follows.

Firstly, the device specifying function unit 62 receives a device specifying request from a service provider or the like (not illustrated). The device specifying function unit 62 that has received the device specifying request transmits an inquiry of a device 66 to all device management function units 64 geographically distributed.

If the device management function unit 64 receives the inquiry from the device specifying function unit 62, the device management function unit 64 recognizes the state of the device 66 from output data or the like of the device 66. If there is a matching device 66, the device management function unit 64 responds to the device specifying function unit 62.

If the device specifying function unit 62 receives the response from any device management function unit 64, the device specifying function unit 62 notifies the service provider or the like that have performed the device specifying request, of access information (IP address or the like) to the device 66.

Here, the number of devices provided on the Internet is large, and the number of device management function units 64 provided to be geographically distributed present is also very large. The number of services is also large, and a large number of device inquiries are normally performed.

Thus, an approach of transmitting an inquiry to all device management function units 64 around the world in response to all service requests becomes a significant burden on computer performance of the device specifying function unit 62. Although it is considered that a limited or efficient inquiry of the device management function unit 64 as an inquiry destination is required, this approach is not stated in the related art.

The present disclosure has been made in view of such circumstances, and an object of the present disclosure is to efficiently specify a device capable of supplying data required for providing a service, from multiple devices connected to a network.

Means for Solving the Problem

To achieve the object described above, according to the disclosure according to claim 1, a distributed device management system for specifying, from among a plurality of devices connected to a network, a device capable of supplying predetermined data used for providing a service. The distributed device management system includes a plurality of device management function units disposed so as to be geographically distributed and configured to manage states of the devices located in respective areas in which the plurality of device management function units are disposed, and a device specifying function unit connected to the plurality of device management function units, that is configured to receive a request for the service, to transmit an inquiry to the device management function unit, and to specify the device capable of supplying the predetermined data. The device specifying function unit includes a device inquiry cache to record a response log including a type of data which was previously requested for the service and an identifier of the device management function unit, under which the device which was capable of supplying the data is placed, and in a case where the predetermined data coincides with the type of the data included in the response log, the device specifying function unit transmits the inquiry to the device management function unit associated with the predetermined data in the response log.

According to the disclosure according to claim 5, a distributed device management method for specifying, from among a plurality of devices connected to a network, a device capable of supplying predetermined data used for providing a service includes the steps of providing a plurality of device management function units disposed so as to be geographically distributed and configured to manage states of the devices located in respective areas in which the plurality of device management function units are disposed, and a device specifying function unit connected to the plurality of device management function units, that is configured to receive a request for the service, to transmit an inquiry to the device management function unit, and to specify the device capable of supplying the predetermined data are provided, by the device specifying function unit, recording a response log in a device inquiry cache, the response log including a type of data which was previously required for the service and an identifier of the device management function unit, under which the device which was capable of supplying the data is placed, and of transmitting the inquiry to the device management function unit associated with the predetermined data in the response log in a case where the predetermined data coincides with the type of the data included in the response log.

In this manner, it is possible to narrow down the device management function unit as an inquiry destination with reference to the previous inquiry history when a device capable of supplying predetermined data used for providing a service is specified among multiple devices, and thus to reduce processing load of the device specifying function unit compared to a case where the inquiry is transmitted to all the device management function units.

According to the disclosure according to claim 2, in the distributed device management system according to claim 1, the device management function unit includes adjacent management-function-unit information, in which another device management function unit located in an area adjacent to an area in which the device management function unit is disposed is recorded, and in a case where there is no device capable of supplying the predetermined data placed under the device management function unit when the inquiry is received from the device specifying function unit, the device management function unit transfers the inquiry to the other device management function unit recorded in the adjacent management-function-unit information.

According to the disclosure according to claim 6, the distributed device management method according to claim 5 further includes transferring the inquiry to another device management function unit located in an area adjacent to an area in which the own device management function unit is disposed, in a case where there is no device capable of supplying the predetermined data placed under the device management function unit when the inquiry is received.

In this manner, it is possible to efficiently expand an inquiry even in a case where a desired device is not provided underneath the device management function unit set as an inquiry destination. In particular, in a case where a device or a target of data moves, it is possible to reduce time required until the desired device is specified, by transmitting an inquiry in order from the other device management function unit which is physically close.

According to the disclosure according to claim 3, in the distributed device management system according to claim 1 or 2, in a case where there is the device capable of supplying the predetermined data at a connection destination of the device management function unit when the inquiry is received, the device management function unit transmits a response including access information of the device to the device specifying function unit, and every time the device specifying function unit receives the response from the device management function unit, the device specifying function unit records a type of the data and an identifier of the device management function unit which has made the response, in the device inquiry cache, as a new response log, and deletes the response log from the device inquiry cache in a descending order of elapsed time from the response.

According to the disclosure according to claim 7, the distributed device management method according to claim 5 or 6 further includes, by the device management function unit, transmitting a response including access information of the device to the device specifying function unit, in a case where the device capable of supplying the predetermined data at an own connection destination when the inquiry is received. In the step of recording, every time the response is received from the device management function unit, a type of the data and an identifier of the device management function unit which has made the response is recorded in the device inquiry cache as a new response log, and the response log is deleted from the device inquiry cache in a descending order of elapsed time from the response.

In this manner, it is possible to delete a response log having validity reduced over time, from the device inquiry cache and to more efficiently specify the desired device.

According to the disclosure according to claim 4, in the distributed device management system according to any one of claims 1 to 3, in a case where the predetermined data does not coincide with the type of the data included in the device inquiry cache, the device specifying function unit transmits the inquiry in order, starting from the device management function unit with the largest number of responses to previous inquiries.

According to the disclosure according to claim 8, in the distributed device management method according to any one of claims 5 to 7, in the step of transmitting the inquiry, in a case where the predetermined data does not coincide with the type of the data included in the device inquiry cache, the inquiry is transmitted in order, starting from the device management function unit with the largest number of responses to previous inquiries.

In this manner, it is possible to narrow down the device management function unit with a high possibility of having the desired device underneath, and to specify the desired device in reduced time.

Effects of the Invention

According to the present disclosure, it is possible to efficiently specify a device capable of supplying data required for providing a service, from among multiple devices connected to a network.

BRIEF DESCRIPTION OF DRAWINGS

FIG. 2 is a table showing an example of an adjacent management-function-unit table DB.

FIG. 3 is a table showing an example of a device inquiry cache DB.

DESCRIPTION OF EMBODIMENTS

Hereinafter, preferred embodiments of a distributed device management system and a distributed device management method according to the present disclosure will be described in detail with reference to the accompanying drawings.

Figure 1:
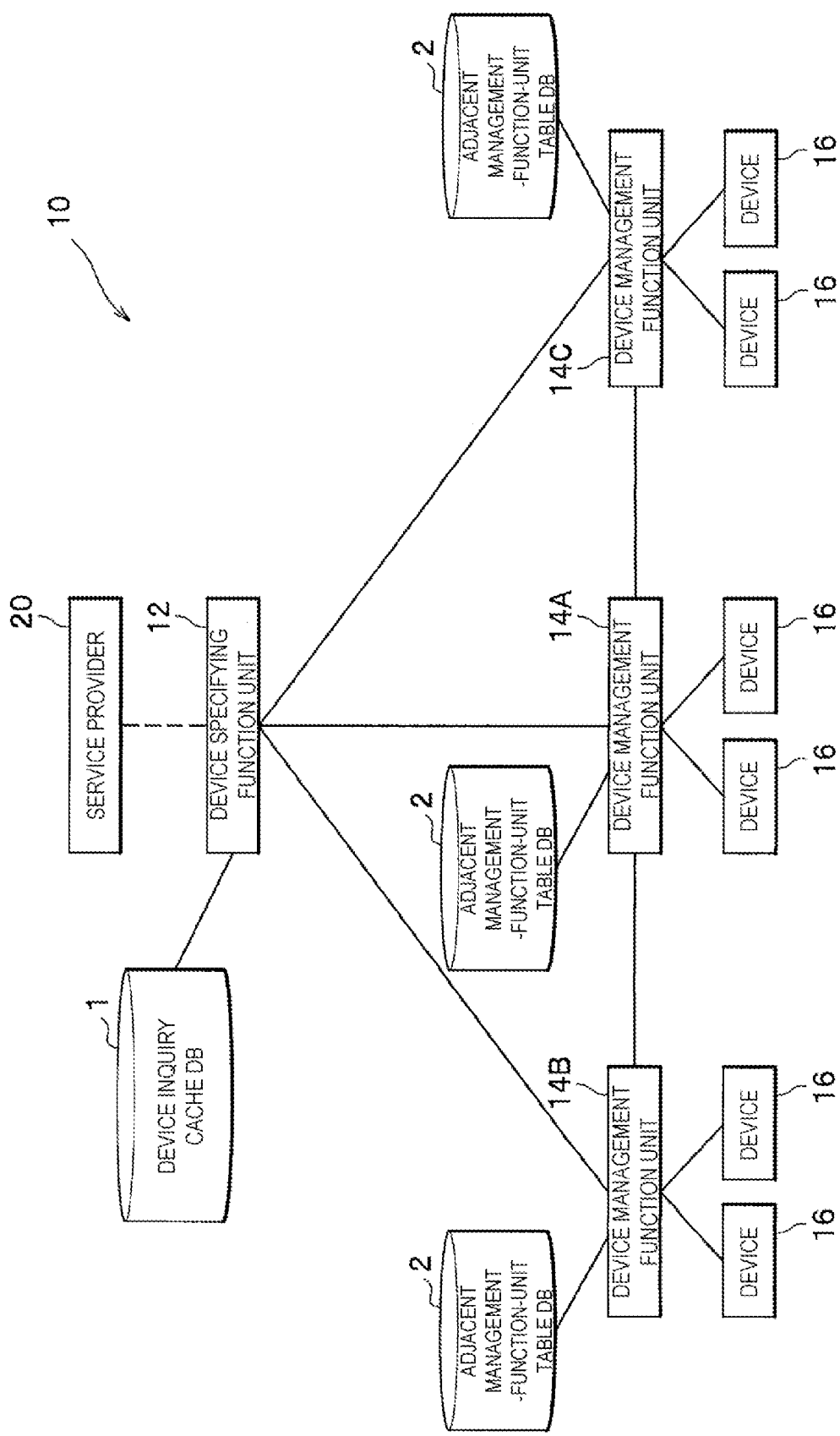
FIG. 1 is a block diagram illustrating a configuration of a distributed device management system according to an embodiment.

FIG. 1 is a block diagram illustrating a configuration of a distributed device management system 10 according to an embodiment.

The distributed device management system 10 is provided for specifying a device 16 capable of supplying predetermined data (referred to as "request data" below) used for providing a service from among a plurality of devices 16 connected to a network.

Figure 6:
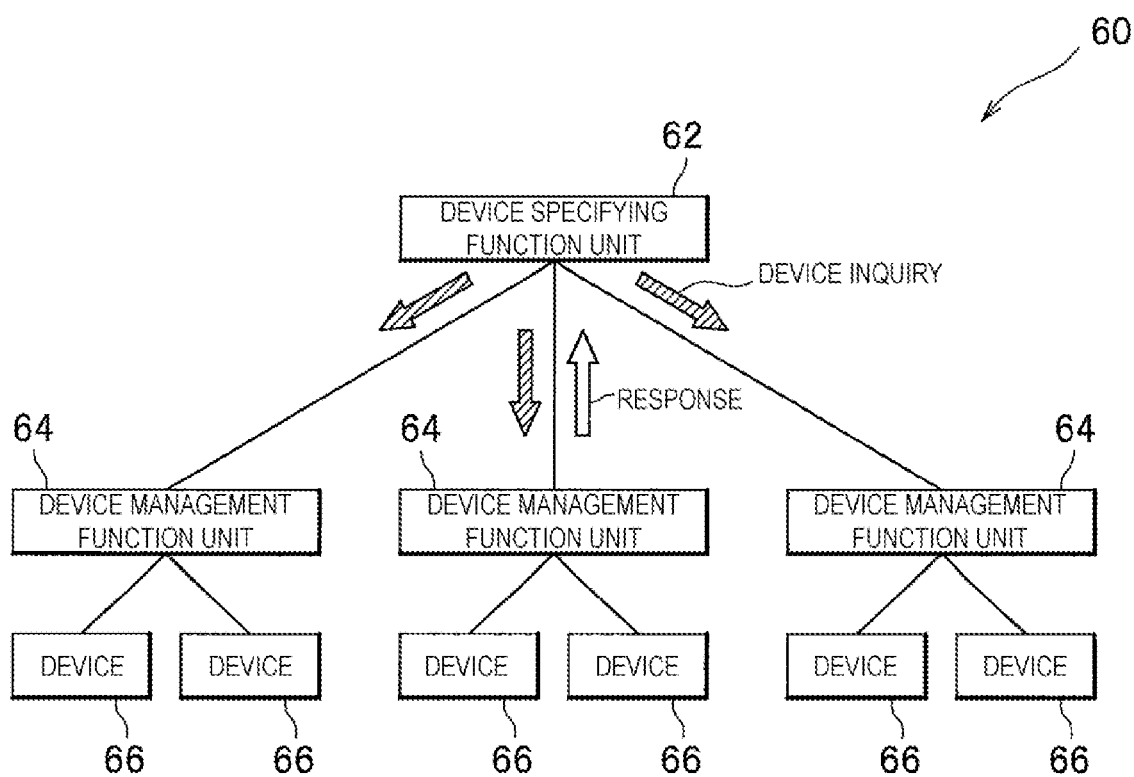
FIG. 6 is a block diagram illustrating an outline of a device management model disclosed in the related art.

Similar to a model 60 illustrated in FIG. 6, the distributed device management system 10 is configured to include a device specifying function unit 12, a plurality of device management function units 14 (14A to 14C), and a plurality of devices 16.

The device 16 is a device such as a camera, a speaker, a microphone, or a display, for example.

The device management function units 14 are geographically distributed and manage the state of the devices located in the deployed areas.

Managing the state of the device refers to, for example, acquiring output data or the like of the device 16 under control and recognizing the content of data allowed to be supplied by the device 16. For example, if the device 16 is a fixed and installed camera, the name of the person and the number of vehicles, which appearing in the camera, or an occurrence (for example, snow and earthquake) around the camera is specified. For example, if the device 16 is a movable camera (such as a camera mounted on a vehicle or a camera of a smartphone), the current position of the camera is specified in addition to the contents similar to those of the fixed and installed camera.

In a case where the device 16 is movable, a different device management function unit 14 manages the state of the device 16 in response to the movement.

Each device management function unit 14 includes an adjacent management-function-unit table DB2 in which another device management function unit 14 located in an area adjacent to an area in which the own device management function unit is disposed is recorded.

FIG. 2 is a table showing an example of the adjacent management-function-unit table DB2 (adjacent management-function-unit information).

For example, in FIG. 1, the device management function unit 14A, the device management function unit 14B, and the device management function unit 14C are assumed to be located in areas adjacent to each other, respectively. In this case, for example, pieces of information of the device management function unit 14B and the device management function unit 14C as illustrated in FIG. 2, specifically, the device management function unit name (identifier) 200 being the name of the device management function unit 14B and an IP address 202 are recorded in the adjacent management-function-unit table DB2 held by the device management function unit 14A.

Returning to the description of FIG. 1, the device specifying function unit 12 is connected to a plurality of device management function units 14 in the distributed device management system 10. The device specifying function unit 12 receives a request for a service (for example, request from a service provider 20), transmits an inquiry to the device management function unit 14, and specifies the device 16 capable of supplying request data.

The content of the inquiry transmitted from the device specifying function unit 12 to the device management function unit 14 includes, for example, the type of device such as a camera or a speaker and the content (for example, video of a specific person) of the request data.

The device specifying function unit 12 has the device inquiry cache DB1 in which a response log including the type of data which was previously required for the service and an identifier of the device management function unit 14 (device management function unit 14 which has responded to the inquiry) that manages the device 16 which was capable of supplying the data is recorded.

FIG. 3 is a table an example of the device inquiry cache DB1.

A request data type 300, a responding device-management-function-unit name 302, an IP address 304, and a registration time 306 are recorded in the device inquiry cache DB1. The pieces of information correspond to a response log.

The type (content) of data (data that has received a device inquiry) that has previously required for the service is recorded in the request data type 300. In the example of FIG. 3, as the type of data, which was previously required, a real-time video of a specific person (Mr/Miss/Mrs. N) and a real-time video of a specific vehicle (automobile having a number XXXX) are exemplified.

The name (identifier) of the device management function unit 14 that transmits a response as a result of an inquiry when the inquiry for data previously exemplified in the request data type 300 is performed, that is, the name (responding device-management-function-unit name) of the device management function unit 14 that manages the device 16 capable of providing the request data is recorded in the responding device-management-function-unit name 302. In the example of FIG. 3, it is recorded that the device management function unit A performs a response for the real-time video of Mr./Miss/Mrs. N, and the device management function unit B performs a response for the real-time video of the automobile having a number XXXX.

An IP address of the device management function unit 14 having a name listed in the responding device-management-function-unit name 302 is recorded in the IP address 304.

The registration time 306 indicates the time at which the response log is registered in the device inquiry cache DB1. The registration time 306 is approximately identical to the time at which the device specifying function unit 12 receives the response from the device management function unit 14.

As described in the Background, in many cases, when a service subject (watching target or the like in the watching service) or the device 16 moves, the device 16 capable of supplying request data may change. In a case where the service target or the device moves, adjacent geographical areas (predetermined geographical region: area) continuously change in most cases. Thus, the device management function unit 14 that transmits a response to the previous similar inquiry or another device management function unit 14 around the above device management function unit 14 has a high possibility of currently managing previously matching devices 16 That is, regarding an inquiry having a record in the past, it is considered that transmission of an inquiry to the device management function unit 14 which has responded at that time is effective.

Thus, in the present embodiment, the device inquiry cache DB1 being a history of previous inquiry results is provided, and the device management function unit 14 as an initial inquiry destination from the next time is selected from the device inquiry cache DB1. Thus, it is possible to efficiently search for the desired device 16.

The device inquiry cache DB1 is a temporary inquiry history. The number of response logs recorded in the device inquiry cache DB1 is to be designed to have an appropriate size considering computer performance and data scan time.

For example, in a case where an object having a moving possibility is set as request data, it is expected that the hit rate of the response log is decreased over time. Thus, because the inquiry result is more useful as the inquiry result becomes latest, an elimination logic of the response log is set to be elimination in order from the old inquiry.

In a case where there are a plurality of identical inquiry contents (response log having an identical request data type 300), only one latest result is stored, for example.

That is, every time the device specifying function unit 12 receives the response from the device management function unit 14, the device specifying function unit 12 records the type of data and the identifier of the device management function unit 14 which has responded, in the device inquiry cache as a new response log, and deletes the response log from the device inquiry cache in a descending order of elapsed time from the response.

Considering reproducibility of an inquiry request, data such as a nominally real-time video is relatively reproducible, but data such as a real-time video of his or her family is highly personal and less reproducible. Thus, regarding the latter data, it is expected that there is no response log in many cases.

In the present embodiment, regarding an inquiry to which there is no response log, an inquiry is transmitted in order, starting from the device management function unit with the largest number of responses among the device management function units 14 set as a transmission source of the response log recorded in the device inquiry cache DB1. This is because it is considered that the device management function unit 14 which has responded to many inquiries has a high possibility of being located in a densely populated area such as the front of city station and has a high possibility of matching another inquiry.

That is, in a case where the request data for the current inquiry does not coincide with the type of data included in the response log in the device inquiry cache DB1, the device specifying function unit 12 transmits an inquiry in order, starting from the device management function unit 14 with the largest number of responses to the previous inquiries.

A specifying flow of the device 16 in the distributed device management system 10 will be described with reference to FIGS. 4 and 5.

Figure 4:
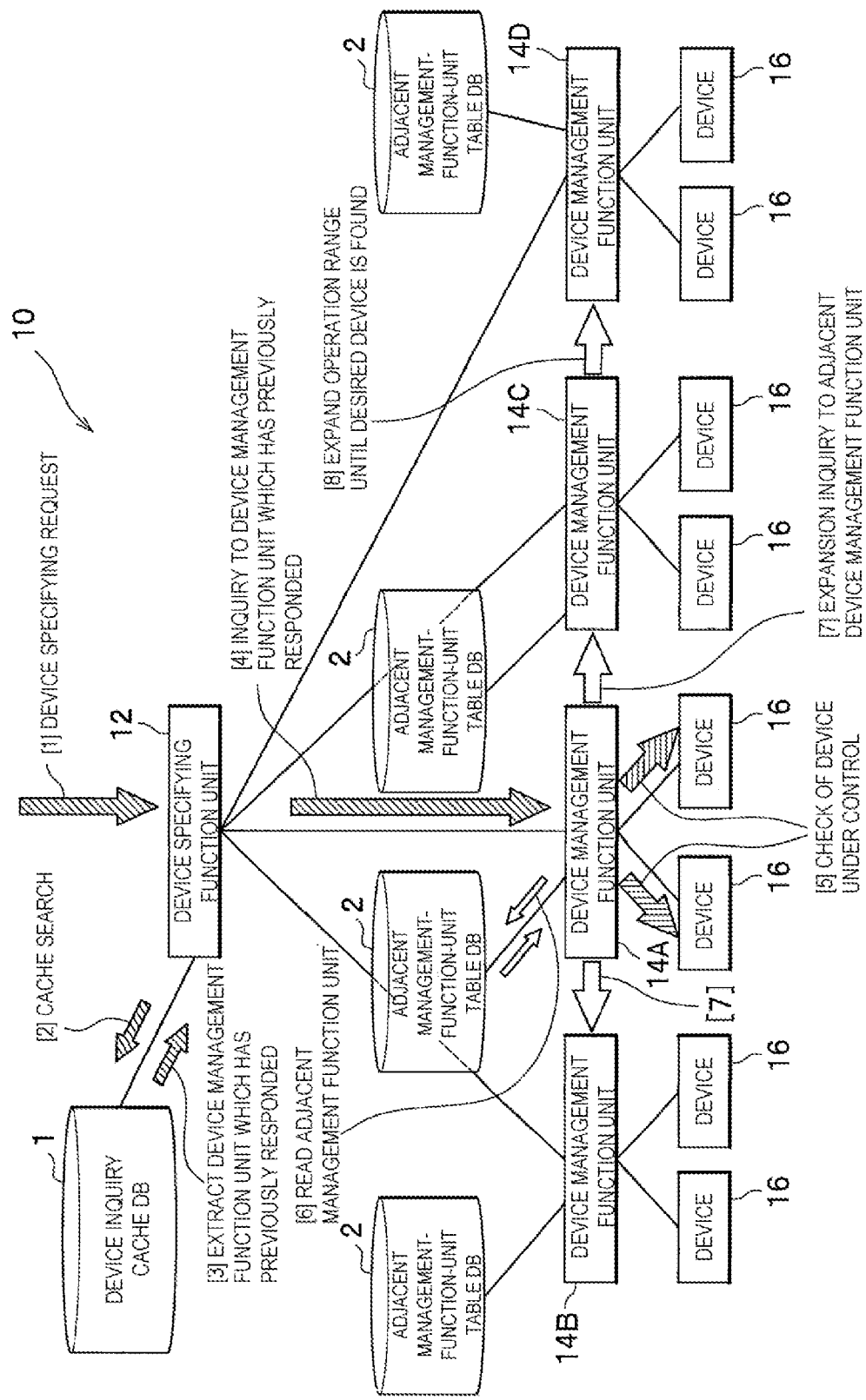
FIG. 4 is an explanatory diagram illustrating a data flow in the distributed device management system.

FIG. 4 illustrates four device management function units 14A to 14D.

Figure 5:
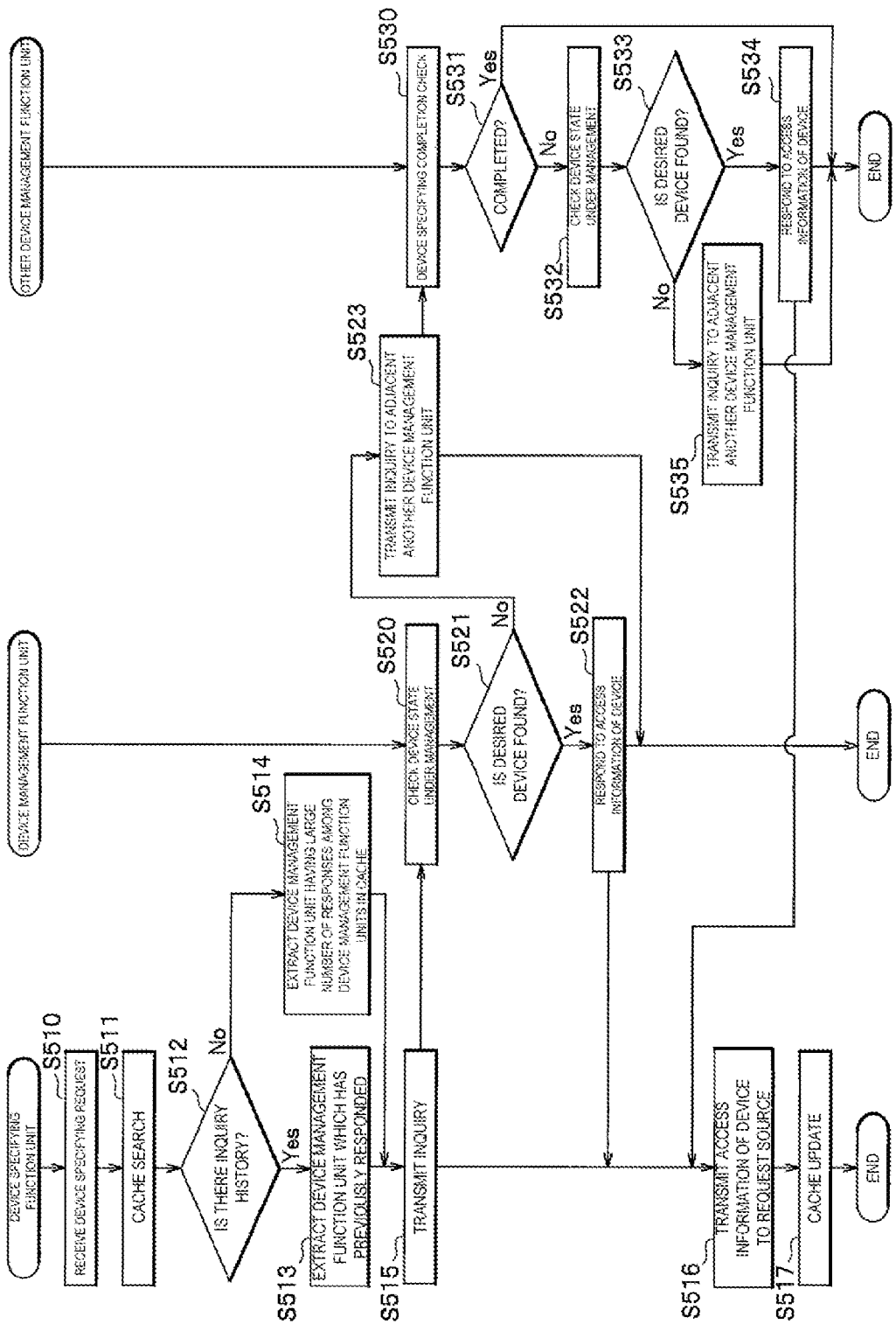
FIG. 5 is a flowchart showing processing in the distributed device management system.

If the device specifying function unit 12 receives a request for specifying the device 16 capable of supplying request data from the service provider 20 (see FIG. 1) or the like (Step S510 in FIG. 5, arrow [1] in FIG. 4), the device specifying function unit 12 searches whether the response log having an identical request data is recorded in the device inquiry cache DB1 (Step S511 in FIG. 5, arrow [2] in FIG. 4).

In a case where the corresponding response log is provided in the device inquiry cache DB1 (Yes in Step S512 of FIG. 5), the device specifying function unit 12 extracts an IP address of the device management function unit 14 which has been described in the response log and has previously responded (Step S513 in FIG. 5, arrow [3] in FIG. 4), and transmits an inquiry to the device management function unit 14 (inquiry step: Step S515 in FIG. 5, arrow [4] in FIG. 4).

In a case where any corresponding response log is not provided in the device inquiry cache DB1 (Step S512: No in FIG. 5), the device specifying function unit 12 extracts an IP address of the device management function unit 14 having a large number of responses to the previous inquiries in the device inquiry cache DB1 (Step S514 in FIG. 5), and transmits an inquiry to the device management function unit 14 (inquiry step: Step S515 in FIG. 5).

The device management function unit 14 which has received the inquiry from the device specifying function unit 12 checks whether there is the device 16 capable of supplying request data under the own control (management) (Step S520 in FIG. 5, arrow [5] in FIG. 4). In a case where the device 16 capable of supplying request data is under control (Step S521 in FIG. 5: Yes), the device management function unit 14 transmits a response including access information (for example, IP address) of the device 16 to the device specifying function unit 12 (response step: Step S522 in FIG. 5).

In a case where the device 16 capable of supplying the request data is not under control (Step S521 in FIG. 5: No), the device management function unit 14 reads an IP address of the other device management function unit (adjacent device management function unit) 14 from the own adjacent management-function-unit table DB2 (arrow [6] in FIG. 4), and transfers the inquiry to the other device management function unit 14 (expansion inquiry step: Step S523 in FIG. 5, arrow [7] in FIG. 4).

For example, although the inquiry is transmitted to the device management function unit 14A from the device specifying function unit 12, the device 16 capable of supplying request data under control of the device management function unit 14A may not be provided. In this case, the device management function unit 14A transmits an expansion inquiry of whether there is a device 16 capable of supplying request data to the device management function unit 14B and device management function unit 14C recorded in the adjacent management-function-unit table DB2.

The other device management function unit 14 which has received the expansion inquiry from the device management function unit 14 firstly performs device specifying completion check for the device specifying function unit 12 (Step S530 in FIG. 5).

The device specifying completion check checks whether the device 16 which is capable of providing the request data and has received the expansion inquiry has not already been specified (whether the inquiry has not been completed). In order to avoid complexity of the drawings, arrows from the other device management function unit 14 to the device specifying function unit 12 are omitted in FIG. 4 and FIG. 5.

In the present embodiment, the search range is expanded, and the plurality of device management function units 14 concurrently check states of the managed devices 16. Thus, even though a certain device management function unit 14 finds the desired device, if it is not possible to deliver finding of the desired device to another device management function unit 14, the search range is extended continuously and thus wasted computational processing is caused.

If the other device management function unit 14 which has received the expansion inquiry performs the device specifying completion check before checking the state of the device under control, it is possible to prevent execution of unnecessary computational processing.

In a case where the inquiry for the request data that has received the expansion inquiry is already completed (Step S531: Yes), the other device management function unit 14 ends processing without checking the state of the device under control.

In a case where the inquiry is not completed (Step S531: No), the other device management function unit 14 checks whether the device 16 capable of supplying request data is provided under the control (Step S532 in FIG. 5). In a case where the device 16 capable of supplying request data is under control (Step S533 in FIG. 5: Yes), the other device management function unit 14 transmits a response including access information (for example, IP address) of the device 16 to the device specifying function unit 12 (response step: Step S534 in FIG. 5).

In a case where the device 16 capable of supplying the request data is not under control (Step S533 in FIG. 5: No), the other device management function unit 14 transmits an expansion inquiry to the still other device management function unit 14 (adjacent device management function unit) recorded in the own adjacent management-function-unit table DB2 (Step S535 in FIG. 5, arrow [8] in FIG. 4).

After that, the still other device management function unit 14 performs the processes of Steps S530 to S535.

If the device specifying function unit 12 receives a response from any device management function unit 14, the device specifying function unit 12 transmits access information of the device 16 capable of supplying request data to a request source that has transmits a request for specifying the device 16 in Step S510 in FIG. 5 (Step S516 in FIG. 5). The device specifying function unit 12 records a response log including the content of the current inquiry, information of the device management function unit 14 which has responded, and the current time point (time point at which the response is received), in the device inquiry cache DB1, and updates the device inquiry cache DB1 (recording step: Step S517 in FIG. 5).

As described above, according to the distributed device management system 10 according to the embodiment, it is possible to narrow the device management function unit 14 as an inquiry destination with reference to the previous inquiry history when the device 16 capable of supplying request data used for providing the service is specified among multiple devices 16, and thus to reduce processing load of the device specifying function unit 12 compared to a case where the inquiry is transmitted to all the device management function units 14.

For example, in a case where the device specifying function unit 12 is implemented by a computer, it is possible to reduce the number of computers used in device search processing.

It is also possible to perform mounting without special hardware and to be applicable to various system configurations. For example, the device specifying function unit 12 and the device inquiry cache DB1 may be realized as a single housing apparatus (device specifying apparatus), or each may be realized as a separate housing apparatus. The device management function unit 14 may also be realized as a single housing apparatus (device management apparatus), or the device management function unit 14 may be provided on an apparatus (such as a gateway) in the network.

REFERENCE SIGNS LIST

10 Distributed device management system
12 Device specifying function unit
14 (14A-14D) Device management function unit
16 Device
20 Service provider
1 Device inquiry cache DB
2 Adjacent management-function-unit table DB (adjacent management-function-unit information)

The invention claimed is:

1. A distributed device management system for specifying, from among a plurality of devices connected to a network, a device capable of supplying predetermined data used for providing a service, the system comprising:
   a plurality of device management function units, including one or more processors, disposed so as to be geographically distributed and configured to manage states of the plurality of devices located in respective areas in which the plurality of device management function units are disposed; and
   a device specifying function unit, including one or more processors, connected to the plurality of device management function units, that is configured to receive a request for the service, to transmit an inquiry to the plurality of device management function units, and to specify the device capable of supplying the predetermined data,
   wherein the device specifying function unit comprises a device inquiry cache to record a response log including a type of data which was previously requested for the service and an identifier of a first device management function unit, under which the device capable of supplying the predetermined data is placed, and in a case where the predetermined data coincides with the type of data included in the response log, the device specifying function unit transmits the inquiry to the first device management function unit associated with the predetermined data in the response log, and wherein:
the first device management function unit includes adjacent management-function-unit information, that includes a second device management function unit located in a second area geographically adjacent to but different from a first area in which the first device management function unit is located,
the first device management function unit is assigned to manage the first area that includes a first set of devices, the second device management function unit is assigned to manage the second area that includes a second set of devices, and
in a case where there is no device included in the first set of devices capable of supplying the predetermined data placed when the inquiry is received from the device specifying function unit, the first device management function unit transfers the inquiry to the second device management function unit based on the second device management function unit being assigned to manage the second area geographically adjacent to the first area, and the second device management function unit determines whether any device in the second set of devices is capable of supplying the predetermined data.

2. The distributed device management system according to claim 1,
wherein, in a case where there is the device capable of supplying the predetermined data at a connection destination of the first device management function unit when the inquiry is received, the first device management function unit transmits a response including access information of the device to the device specifying function unit; and
every time the device specifying function unit receives the response from the first device management function unit, the device specifying function unit records the type of the data and the identifier of the first device management function unit which has transmitted the response, in the device inquiry cache, as a new response log, and deletes a previous response log from the device inquiry cache in a descending order of elapsed time from the response.

3. The distributed device management system according to claim 1,
wherein, in a case where the predetermined data does not coincide with the type of the data included in the device inquiry cache, the device specifying function unit transmits the inquiry in order, starting from a device management function unit with a largest number of responses to previous inquiries.

4. A distributed device management method of specifying, from among a plurality of devices connected to a network, a device capable of supplying predetermined data used for providing a service, the method comprising the steps of:
providing a plurality of device management function units, including one or more processors, disposed so as to be geographically distributed and configured to manage states of the plurality of devices located in respective areas in which the plurality of the device management function units are disposed, and a device specifying function unit, including one or more processors, connected to the plurality of device management function units, that is configured to receive a request for the service and to transmit an inquiry to the plurality of device management function units, and to specify the device capable of supplying the predetermined data;
recording, by the device specifying function unit, a response log in a device inquiry cache, the response log including a type of data which was previously required for the service and an identifier of a first device management function unit, under which the device capable of supplying the predetermined data is placed;
transmitting, by the device specifying function unit, the inquiry to the first device management function unit associated with the predetermined data in the response log in a case where the predetermined data coincides with the type of the data included in the response log, wherein the first device management function unit is assigned to manage a first area including a first set of devices, a second device management function unit is assigned to manage a second area including a second set of devices, the second area is geographically adjacent to but different from the first area; and
in a case where there is no device included in the first set of devices capable of supplying the predetermined data, transferring, by the first device management function unit, the inquiry to the second device management function unit based on the second device management function unit being assigned to manage the second area geographically adjacent to the first area in which the first device management function unit is located, and the second device management function unit determines whether any device in the second set of devices is capable of supplying the predetermined data.

5. The distributed device management method according to claim 4, further comprising:
transmitting, by the first device management function unit, a response including access information of the device to the device specifying function unit in a case where there is the device capable of supplying the predetermined data at a connection destination when the inquiry is received,
wherein, in the step of recording the response log in the device inquiry cache, every time the response is received from the first device management function unit, the type of the data and the identifier of the first device management function unit which has transmitted the response is recorded in the device inquiry cache as a new response log, and a previous response log is deleted from the device inquiry cache in a descending order of elapsed time from the response.

6. The distributed device management method according to claim 4,
wherein, in the step of transmitting the inquiry, in a case where the predetermined data does not coincide with the type of the data included in the device inquiry cache, the inquiry is transmitted in order, starting from a device management function unit with a largest number of responses to previous inquiries.

* * * * *